United States Patent [19]

Sliski

[11] 4,455,641

[45] Jun. 19, 1984

[54] LINEAR TRACKING SYSTEM

[75] Inventor: Alan P. Sliski, Lexington, Mass.

[73] Assignee: Dennesen Electrostatics, Inc., Beverly, Mass.

[21] Appl. No.: 107,063

[22] Filed: Dec. 26, 1979

Related U.S. Application Data

[63] Continuation-in-part of Ser. No. 941,470, Sep. 12, 1978, abandoned.

[51] Int. Cl.³ .................................................. G11B 3/10
[52] U.S. Cl. ..................................... 369/249; 369/244; 369/252
[58] Field of Search ................. 274/23 R, 23 A, 23 B; 308/DIG. 1, 9, 10; 104/283; 369/249, 244, 252

[56] References Cited

U.S. PATENT DOCUMENTS

| | | | |
|---|---|---|---|
| 1,868,304 | 7/1932 | Cargill | 274/23 A |
| 2,869,877 | 1/1959 | Bard | 274/23 A |
| 2,948,538 | 8/1960 | Tomaselli | 274/23 A |
| 3,006,652 | 10/1961 | Mankovitz | 274/23 A |
| 3,390,886 | 7/1968 | Rabinow | 274/23 R |
| 3,418,435 | 12/1968 | Norris | 274/23 A |
| 3,479,038 | 11/1969 | Eisner | 274/23 A |
| 3,771,797 | 11/1973 | Braun | 274/23 A |
| 3,885,504 | 5/1975 | Baermann | 308/10 X |
| 3,952,666 | 4/1976 | Gladish | 308/5 R |
| 4,065,188 | 12/1977 | Ridler | 204/23 A |
| 4,087,095 | 5/1978 | Koda | 274/23 A X |
| 4,128,280 | 12/1978 | Purtschert | 308/9 |

FOREIGN PATENT DOCUMENTS 1045020  10/1966  United Kingdom ............. 274/23 A Primary Examiner—Harry N. Haroian
Attorney, Agent, or Firm—Thomas C. Stover, Jr.

[57] ABSTRACT

In a linear tone arm tracking system for a record player where the stylus tone arm moves on a guiderail across a recording, eg. a record disc on a turntable, an improvement is provided in which the stylus tone arm is connected to a partial sleeve, which sleeve hovers partially over the guiderail and means, such as air pressure means, causes the partial sleeve to hover over the guiderail in proximity therewith, so that when the stylus rides in the record groove and is laterally shifted thereby, the tone arm and partial sleeve readily shift over the guiderail in response to the shift of the stylus.

Further provided is a means for raising and lowering the guiderail which adjusts the elevation of the partial sleeve and tone arm and accordingly adjusts the vertical tracking angle of the stylus in the record groove.

17 Claims, 13 Drawing Figures

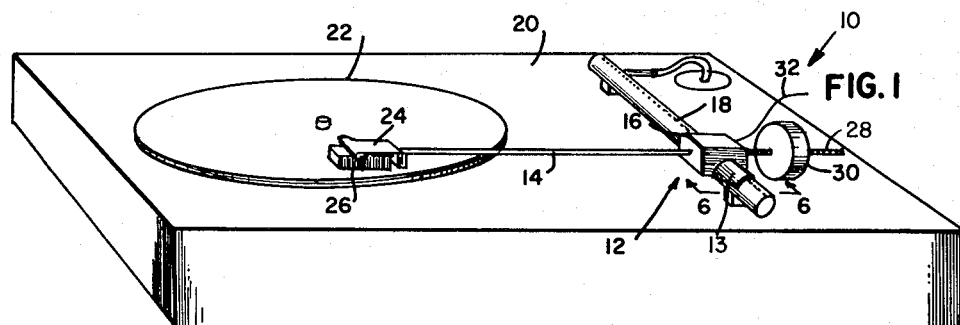
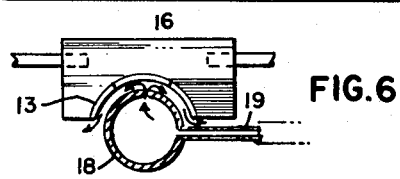
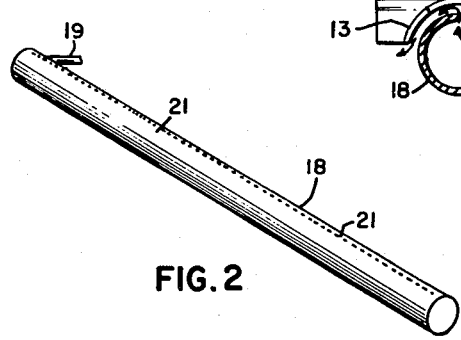
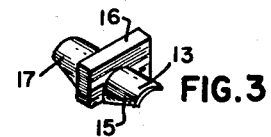
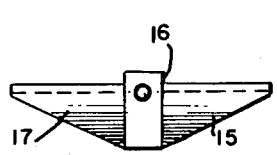
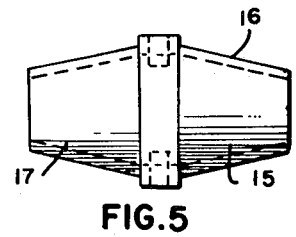

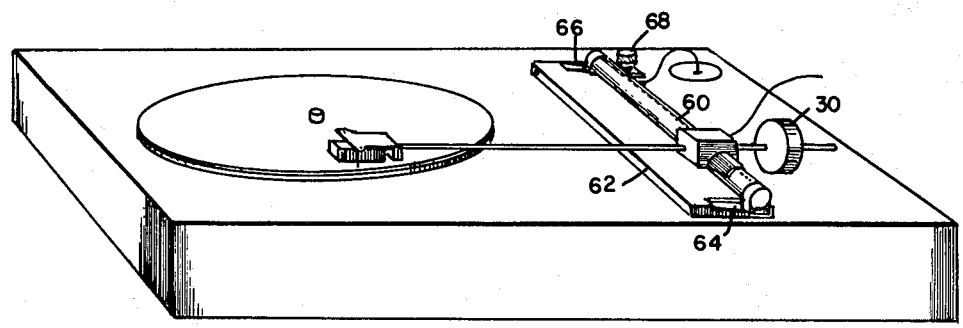
FIG. 10
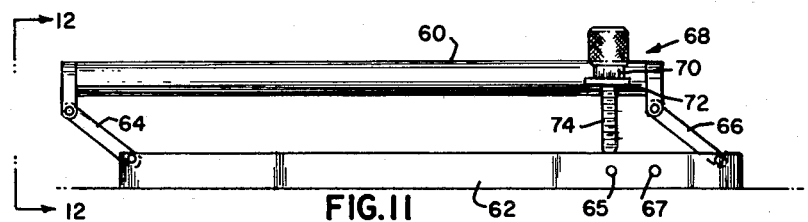
FIG. 11
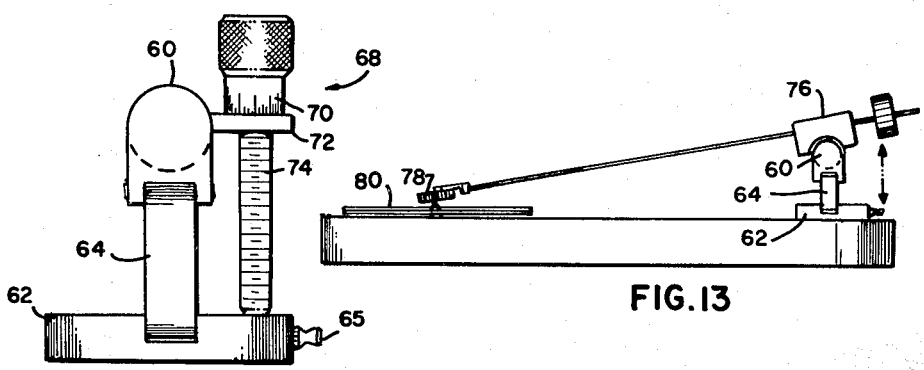
FIG. 12
FIG. 13

LINEAR TRACKING SYSTEM

This is a continuation-in-part of the applicant's prior co-pending application, Ser. No. 941,470, filed on Sept. 12, 1978, for Linear Tracking Tonearm, now abandoned.

BACKGROUND OF THE INVENTION

1. Field of the Invention

This invention relates to a hovering tone arm for a recording playback apparatus particularly a hovering linear tone arm tracking system for a recording playback apparatus.

2. The Prior Art

In the recording playback industry linear tone arm tracking systems are well known for their tracking accuracy in view of their structural similarity to the linear stylus that cuts the record master as compared with the more common pivotable tone arm which must swing in an arc across a recording and a built-in tracking error results. Accordingly, linear tracking playback systems for recordings are inherently more accurate than their pivotable counterparts and such linear systems are enjoying increasing demand from hi-fi (and stereo) fans.

Such linear tracking pickup and playback systems have been the subject of several U.S. patents. In the earlier systems a stylus arm would ride directly on a rail powered by a small servo motor which was designed to compensate for the friction of the system and to shift (the pivot end of) the tone arm to correspond with the shift of the stylus as it radially traversed the grooves of a rotating record. However, difficulties in synchronizing the servo motor with the shift of the stylus led to development of the floating or hovering tone arm, which rides above a linear rail in response to groove pressures on the tracking stylus, eliminating the need for a servo motor. Accordingly, the tone arm friction is reduced to that of moving the tone arm through the air.

The above development has been the subject of several U.S. patents, e.g. U.S. Pat. No. 3,479,038 to Eisner, U.S. Pat. No. 4,087,095 to Koda and U.S. Pat. No. 3,771,797 to Braun.

The first two patents, Eisner and Koda, disclose a linear tracking system wherein a tone arm is connected to a sleeve which surrounds and rides on an air cushion emitted by an air-bearing tube. The tube is positioned parallel to a turntable radius so that the stylus moves radially on a record. Such surrounding sleeves have a drawback in that they require a considerable amount of air pressure to maintain a clearance all the way around the support tube or rail and accordingly require a relatively large compressor to maintain such sleeve in a hovering, low friction position, cross-sectionally speaking.

The full or enclosing sleeve adds considerable weight to the tone arm, requiring considerable air pressure to keep such assembly suspended, as discussed above. Then there is a tolerance problem, for should the sleeve shift in any direction, it can contact the rail or air-bearing tube, introducing friction and immediate stress and distortion to the playback system.

The Braun reference discloses a permanent-magnet guideway which receives a permanent magnet guide piece or tone arm carriage, the guide piece being held in a hovering position in the guideway by magnetic forces. As shown in FIG. 3 of the Braun reference, the guide piece, while disclosed as hovering in the guide channel, is held captive within the confines thereof and has limited sectional rotational movement, which lack requires the tone arm to be suspended below the guide piece on a pivot. Thus, the tone arm and guide piece assembly cannot readily be removed from such guideway.

Accordingly, in the prior art linear tracking systems which have a hovering carriage on a guide rail, all three are held relatively captive sectionally on such rail, cannot be lifted directly off such rail, except at the ends thereof, and have considerable weight which requires considerable supporting forces, either gaseous or magnetic.

Accordingly, in a linear tracking recording playback system there is a need and market for a tone arm carriage and guideway assembly that obviates the above prior art shortcomings.

There has now been discovered a tone arm carriage and guideway assembly for a linear tracking system for a recording wherein the carriage is light-weight, readily hovers above the guideway and instead of being captive on such guideway, readily sectionally pivots thereon and lifts off such guideway at any desired point. Further, the tone arm carriage rides or hovers over the linear guideway on a gas bearing or, in another embodiment, on a magnetic bearing.

SUMMARY

Broadly, the present invention provides, in a linear tone arm tracking system for a record player where the stylus tone arm moves on a guideway across a recording, the improvement comprising a carriage for said guideway, which carriage includes a partial sleeve connected to said tone arm at a point removed from the stylus thereof, said sleeve fitting partially over said guideway and means to cause said sleeve to hover over said guideway in spaced proximity therewith so that when said stylus rides in a groove of a recording and is laterally shifted thereby, said stylus arm and partial sleeve readily shift over said guideway in response to the shift of said stylus.

In one embodiment the partial sleeve hovers on a gas layer over said guideway.

In another embodiment the partial sleeve hovers on magnetic forces over said guideway.

By "sectional pivoting" of the tone arm carriage assembly is meant pivoting such assembly cross-sectionally relative to said guideway, upwardly and downwardly, e.g. as the stylus rides over a rise or bump in a record surface.

By "lateral pivoting" of the tone arm carriage assembly is meant, pivoting thereof longitudinally relative to said guideway, e.g. as the stylus radially oscillates on a record surface, e.g. due to eccentric rotation of such record.

By "partial sleeve" is meant a sleeve which does not extend fully around (in cross-section) to define a full sleeve or tube.

By "hover over" is meant (a partial sleeve which is) spaced above or spaced at least partially around a guideway.

By "record" is meant a disc, an annular body, e.g. a cylinder and the like that stores information, e.g. data, music and the like

BRIEF DESCRIPTION OF THE DRAWINGS

The invention will become more apparent from the following detailed description and drawings in which;

FIG. 1 is a perspective view of the linear recording tracking system embodying the invention;

FIG. 2 is a perspective view of a component of the linear tracking system embodiment shown in FIG. 1;

FIG. 3 is a perspective view of another component of the linear tracking system embodiment shown in FIG. 1;

FIG. 4 is an elevation view of the component shown in FIG. 3;

FIG. 5 is a plan view of the component shown in FIG. 3;

FIG. 6 is a fragmentary elevation view, partly in section, of a portion of the linear tracking system shown in FIG. 1, taken on lines 6—6, looking in the direction of the arrows;

FIG. 10 is a perspective view of the VTA apparatus embodying the present invention;

FIG. 11 is a side elevation view of a portion of the VTA adjustment apparatus shown in FIG. 10;

FIG. 12 is an end elevation view of the adjustable VTA component apparatus shown in FIG. 11, taken on lines 12—12, looking in the direction of the arrows, and FIG. 13 is a partially schematic elevation view of the VTA apparatus of FIG. 10 in operation.

DETAILED DESCRIPTION OF THE DRAWINGS

Figure 7:
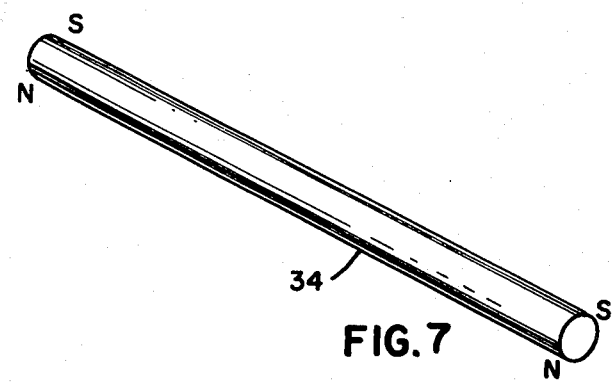
FIG. 7 is a perspective view of a component of another linear tracking system embodying the present invention.

Referring in more detail to the drawings, the linear tracking system 10 embodying the invention, includes a tone arm carriage and guideway assembly 12, which includes a tone arm 14 which is mounted on carriage 16, which includes a partial sleeve 13 and which hovers over or rides on (above) guideway 18, which is mounted on housing 20 proximate turntable 22, as shown in FIG. 1. Mounted to the tone arm 14 is stylus cartridge 24 and stylus 26, as shown in FIG. 1. Mounted on the opposite side of the carriage 16 is helically threaded balance rod 28 and matchingly threaded counterweight 30, to balance the tone arm and carriage assembly 12 (and to provide adjustment of the tracking force on the stylus), as it rides or hovers over the guideway 18, as indicated in FIG. 1. The guideway tube 18 has gas inlet tube 19 and gas outlet apertures 21, which direct the flow of gas, e.g. compressed air that supports the tone arm carriage 16 above the guideway 18 as shown in FIGS. 2, 3 and 6.

Electric power is applied to the stylus cartridge 24 through the tone arm 14 by electric conductors 32, while power means (not shown) drives the turntable.

Figure 8:
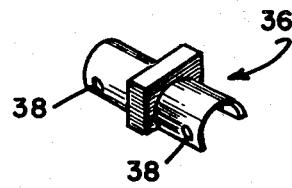
FIG. 8 is a perspective view of another component of said other embodiment of the linear tracking system of the invention.

In another embodiment of the linear tracking system of the invention, the pneumatic guideway 18 is replaced by a magnetic guideway 34, shown in FIG. 7, and the tone arm carriage 16 is replaced by the tone arm carriage 36, which has four magnets 38 of polarity opposing that of the magnetized guideway, which magnets 38 are mounted at the four corners of the carriage 36, as shown in FIG. 8. The magnets are positioned in such a way on the partial sleeve of the carriage 36 as to provide lift and a self-centering action therefor when such carriage is positioned over the guideway 34.

Figure 9:
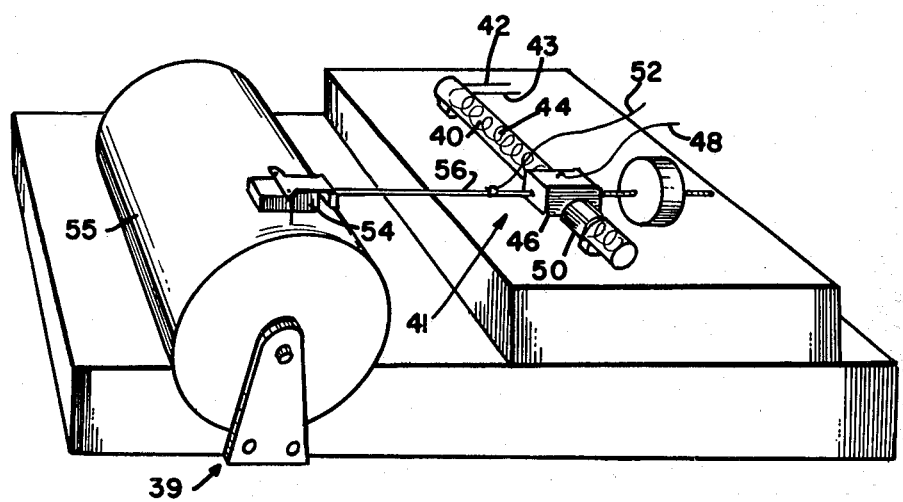
FIG. 9 is a perspective view of another linear recording tracking system embodying the invention.

The magnets of the above components can be permanent magnets. However, such magnets can also be electromagnetic as well. Accordingly, the linear tracking system 39 has tone arm carriage and guideway assembly 41 in which the carriage 46 hovers and rides over the electromagnetic guideway 40, as shown in FIG. 9. Electric conductors 42 and 43 conduct current (from a power source not shown) into an electromagnetic coil 44, as shown in FIG. 9, which current can be reversed by switching means, not shown, to achieve the desired polarity in such guideway 40. Electric conductor 48 conducts electric current (from a power source not shown) to the magnets 50 mounted in the carriage 46, shown in FIG. 9, to provide the desired opposing polarity to cause the carriage 46 to hover on the guideway 40. Electric conductor 52 conducts electric power to the stylus cartridge 54 mounted on the tone arm 56, as shown in FIG. 9.

A significant feature of the partial sleeve embodying the invention is its self-centering capability over the guideway. Thus, as the stylus moves laterally across a record, the partial sleeve resists turning diagonally with respect to the guideway and moves along over the guideway in response to such movement of the stylus. In this manner, the tone arm and stylus cartridge maintain their respective orientation or angle with respect to the guideway (e.g. 90° or other angle) as the stylus moves laterally across a record. For example, in the pneumatic embodiment of the invention, air pressure differential between the sleeve and its guideway resists the diagonal turning of the former and causes such sleeve to be automatically self-centering on the guideway. In the magnetic embodiment, magnetic force differential likewise centers the partial sleeve.

In the pneumatic and magnetic embodiments of the tone arm carriage and guideway assembly of the invention, the tone arm carriage readily hovers and glides over its respective guideway in a virtually friction-free manner in response to the pressure of the record groove on the stylus mounted on such tone arm as described above. Yet, either the pneumatic or the electromagnetic tone arm and carriage can be readily lifted off the guideway since such carriage includes a partial sleeve which does not surround such guideway. This permits such stylus arm to readily ride over bumps or rises in records and permits the ready removal and replacement of such stylus tone arm as desired.

Another advantage of the partial sleeve configuration of the tone arm carriage embodying the invention is that a plurality of such tone arms and carriages can be positioned on the guideway, at the same time, to play on the same record and the amplified sound pickup therefrom, switched back and forth between such tone arms to compare the individual sonic characteristics of the stylus cartridges. In this manner the purchaser can make a direct comparison between such stylus cartridges before a purchase.

The length of the partial sleeve of the carriage is influenced by at least two considerations. The first is that many, if not most, record discs have a spindle hole that is not dead center, but slightly off-center. Accordingly, the record is turned on the turntable in an eccentric rotation which causes the stylus and thus the tone arm to slightly pivot or oscillate as the record turns, which accordingly causes the tone arm and partial sleeve to oscillate laterally with respect to the guideway. Further, there is a pivot motion applied to the tone arm when the stylus enters the lead-out groove of a disc recording. Accordingly, if the partial sleeve is overlong, such pivot or oscillation can cause such partial sleeve to contact the guideway causing friction therebetween. Accordingly, as an additional feature of the present invention, the partial sleeve 13, is advantageously formed so as to have bevelled edges 15 and 17 as shown in FIGS. 3, 4 and 5, to permit the stylus tone arm and carriage, including the partial sleeve, greater lateral rotation (e.g. as the stylus oscillates in the grooves of the turning record) before such partial sleeve contacts the guideway.

Therefore, what influences the length of the partial sleeve are these factors; the longer the sleeve, the less the gas pressure required to support it over the guideway, but the more the tendency of the sleeve to contact the guideway during the above-mentioned oscillation. Accordingly, the sleeve is sized (and advantageously bevelled) as a trade-off; long enough to have sufficient gas support and short enough so that the tone arm can sufficiently oscillate (without the above guideway contact) on record surfaces. Another factor is the length of the tone arm; the longer the arm, the less is the swing or oscillation that is transmitted back to the partial sleeve.

It can be seen that the linear tracking system embodying the invention, including the tone arm carriage or partial sleeve and guideway assembly, provides a relatively low weight, wide tolerance, assembly, which moves in a virtually frictionless manner over the guideway in response to the record groove acting on the stylus. Further, the tone arm and carriage pivot biaxially, that is, laterally, with respect to the guideway and sectionally with respect to the guideway, as required by the characteristics of a record. Further, the tone arm carriage unit is not a captive of the guideway but readily lifts off for inspection, adjustment, repair or replacement or several such tone arm carriage units can be placed in the same guideway for stylus comparison purposes, as discussed above.

The linear tracking system of the invention is suitable for operation with record discs and similarly can be employed with tracking record cylinders, or any grooved recording medium where the stylus travels laterally with respect to such medium.

With respect to the pneumatic linear tracking system of the invention, the guideway desirably defines a ridge or tube and said partial sleeve contours at least partially over said ridge. More preferred in such case, is a guideway that is a ridge rounded in cross-section and said partial sleeve is curved in cross-section to fit over said ridge in spaced relationship. The partial sleeve, e.g. sleeve 13, as shown in FIG. 6, desirably is larger, e.g. has an inner radius slightly larger than the outer radius of the guideway to assure ample clearance therebetween.

As previously discussed, in the pneumatic embodiment of the invention, gas, e.g. compressed air, issues from apertures in the guideway to support the tone arm carriage thereover. Alternately, within the scope of the invention, the gas is channeled to such carriage and is discharged downwardly at a guideway from apertures which extend to the bottom surface in the above-described partial sleeve. Such downward gas flow against a passive guideway likewise supports the tone arm carriage in a hovering position thereover.

The guideway can be rounded or angular in cross-section and preferably is rounded, e.g. a tube.

In the pneumatic embodiment of the invention, the guideway is preferably made of metal or plastic, e.g. brass or fiberglass reinforced plastic (FRP) and is desirably hollow or at least grooved at the upper surface thereof for gas conducting purposes.

Also in the pneumatic embodiment, the carriage including the partial sleeve is made of plastic or metal and preferably acrylic plastic.

In the magnetic embodiment of the invention, the guideway preferably contains a permanent magnet made of ferrite or an electromagnet made of soft iron. The carriage, including the partial sleeve contains permanent or electromagnets and is suitably made of the materials exemplified above. The permanent magnets are preferably made of samarium cobalt.

The tone arm desirably joins the partial sleeve at an angle with the long axis thereof, which can be a right angle or other angle as desired. As discussed above, said partial sleeve is desirably bevelled on the longitudinal sides thereof.

Where gas is employed as the hover means between the partial sleeve and the guideway, such gas is preferably compressed air. However, other gases can be employed, where desired, e.g. nitrogen or other relatively inert gas or a combination thereof.

The compressed air can be provided from a small pump, e.g. an aquarium air pump equipped with a small air tank to absorb fluctuations in the air flow.

In the pneumatic guideway embodying the present invention the gas pressure, e.g. air pressure employed is determined by the size and weight of the carriage and tone arm assembly and is sufficient to cause such carriage to hover in close proximity above a guideway. For example, air pressure of 1 to 2 psi can be employed, through apertures in the guideway sized 10 mils in diameter and spaced apart 100 mils.

The following example is intended to illustrate the present invention and should not be construed in limitation thereof.

EXAMPLE I

On a turntable 12" in diameter a guideway 8" long having apertures spaced 100 mils apart and 10 mils in diameter, was mounted adjacent thereto. On such guideway was mounted a tone arm 7" long on a carriage or partial sleeve 1¾" long, which assembly was balanced by a counterweight of about 1 ounce. A 12" record was placed on the turntable and operated at 33 rpm and with the air pressure in the pneumatic guideway set at about 2 psi, the tone arm carriage hovered above such guideway, in close proximity therewith and permitted the stylus to track the record grooves in a linear manner, the carriage moving on the guideway in response to the lateral motion of the stylus attached to said tone arm, with the result that the recording playback was of high fidelity of tone and surprising clarity of sound reproduction.

VERTICAL TRACKING ANGLE METHOD AND APPARATUS

It is desirable in a linear tracking system for playback of recordings to obtain a rake angle of the stylus in a record groove e.g. by raising the (vertical) pivot point of the tone arm to most closely approximate the rake angle of the stylus that cut the record master, known as the vertical tracking angle (VTA) of such record. Such adjustment is advantageous because the VTA often differs from record to record owing to a lack of industry standards for the angle of the cutting stylus in the production of record masters. Accordingly, as indicated above, for most accurate reproduction and playback of sound from a recording, it is desirable to set the VTA of the (linear tone arm) stylus to correspond with the VTA of the stylus that cut the master for the record being played.

The present invention provides means for adjustment of the VTA of the stylus during playback of a record and permits audio "tuning-in" of the record being played, i.e. where the playback sound quality of the recording perceptibly improves to a peak value, indicating the correct VTA setting for that record. At such VTA the stylus and pickup cartridge more accurately mimic the record contact angle of the cutter head. The present invention therefore enables the determination (and notation) of the correct VTA of a record during the playback thereof.

SUMMARY

The present invention additionally provides in a linear tone arm tracking system for a record player where the stylus tone arm is supported on a carriage, said carriage being movably mounted on a guideway, said guideway being mounted on a base proximate said record player, the improvement comprising a height adjuster for said guideway to raise or lower said guideway relative to said record player to adjust the elevation of said carriage and tone arm and the VTA of said stylus.

Such VTA adjustment is accomplished by mounting the abovedescribed embodiment of the guideway of the invention, e.g. guideway 60 on base member 62, on pivotable connecting support arms 64 and 66, as shown in FIGS. 10, 11 and 12. The pivotable support arms 64 and 66 permit the raising and lowering of the guideway 60 relative to the support member 62, as indicated in FIGS. 10 and 11. To enable fine adjustment of such guideway height setting, the micrometer 68, having calibration marks 70, is mounted in support flange 72 of the guideway member 60, as shown in FIGS. 10, 11 and 12. The micrometer 68 additionally has threaded extension leg 74 which makes contact with the base 62 of the guideway support assembly 61, as shown in FIGS. 11 and 12. The turning of the micrometer 68, of course, extends or permits retracting of such leg 74, which provides a calibrated measure for raising or lowering the guideway 60 relative to the support base 62, as indicated in FIG. 11. That is, turning the micrometer 68 to extend the leg 74, raises the guideway 60 relative to the support base 62, in a measured mechanical way. To lower the guideway 60, the micrometer 68 is counter-rotated to retract its leg 74 and then the guideway is lowered, e.g. manually, relative to the support base 62 until a desired elevation is reached or until the micrometer leg 74 again contacts the support base 62.

In the case of guideways embodying the invention employing gas bearings, gas, e.g. compressed air is admitted to inlet ports 65 and 67 in the support base 62, through a conduit, e.g. hollow support arm 66 to the hollow guideway tube 60 (and then out air ducts in such guideway tube as previously discussed) as shown in FIG. 11. Of course, gas supply lines can connect directly to the guideway tube, e.g. guideway tube 60, where desired.

In operation, e.g. with a disc record being played on a turntable, as indicated in FIG. 13, the operator, while listening to the playback and with the guideway set at a relatively low elevation, axially rotates the micrometer 68, as shown in FIG. 11, to raise the guideway 60 and thus the tone arm carriage 76, which adjusts the VTA of the stylus cartridge 78 relative to the record 80, until the listener or operator hears a peak of sound playback clarity and quality which establishes the correct VTA for that record. The reading on the micrometer scale 70 is then notes and e.g. written on the record jacket or label for future use. That is, when such record is played again, the VTA of the guideway of the linear tracking system embodying the invention can be preset to such determined VTA value.

A similar procedure is employed for each recording, e.g. disc or cylinder (or other shape) and the VTA setting and reference number accordingly obtained and noted.

Accordingly, the present invention provides method and apparatus for prompt and accurate adjustment of the VTA of each recording during the playing thereof which enhances the high quality and clarity of the linear tracking and playback of records according to the present invention.

Moreover, such VTA adjustment apparatus can be employed with various linear tracking systems, whether gas bearing, lubricated bearing, or magnetic support bearing as well as the mechanically supported bearing systems of the prior art described above, i.e. virtually any linear tracking systems for sound pickup and playback.

What is claimed is:

1. In a linear tone arm tracking system for a record player where the stylus tone arm moves on a guideway across a recording, the improvement comprising a carriage for said guideway, which carriage includes a partial sleeve connected to said tone arm at a point removed from the stylus thereof; said sleeve fitting partially over said guideway, said partial sleeve having a substantially centrol portion and beveled end portions extending from said central portion to the ends of said sleeve so that said sleeve diminishes in surface area from said centrol portion outwardly towards said ends and means to cause said sleeve to hover over said guideway in substantially symmetrical proximity therewith so that when said stylus rides in a groove of a recording and is laterally shifted thereby, said tone arm and partial sleeve readily shift over said guideway in response to the shift of said stylus.

2. The tracking system of claim 1 wherein said guideway emits a gas layer thereon to support said sleeve over said guideway.

3. The tracking system of claim 1 wherein said guideway and said sleeve are magnetized with opposed polarities to support said sleeve over said guideway.

4. The tracking system of claim 1, 2 or 3 wherein said guideway defines a ridge and said partial sleeve contours partially over said ridge.

5. The tracking system of claim 4 wherein said ridge is rounded in cross-section and said partial sleeve is curved in cross-section to fit over said guideway in spaced relationship.

6. The tracking system of claim 1 wherein said sleeve and thus said tone arm are free to pivot sectionally with respect to said guideway.

7. The tracking system of claim 1 wherein said partial sleeve and thus said tone arm are pivotable sectionally and laterally with respect to said guideway.

8. The tracking system of claim 1 wherein said partial sleeve and thus said tone arm can be readily lifted off said guideway and replaced as desired.

9. The tracking system of claim 1, 2 or 3 wherein said partial sleeve extends on both sides of said tone arm at an angle therewith.

10. The tracking system of claim 1 mounted proximate a record turntable for use therewith.

11. The tracking system of claim 1 mounted proximate a recording cylinder for use therewith.

12. The tracking system of claim 1 wherein said guideway is an apertured hollow compressed air tube and said partial sleeve is a partial cylindrical member which fits over said tube in spaced relationship therewith, and the hover means is a compressed air source which supplies compressed air into said tube and out said apertures to support said partial sleeve in a spaced manner over said guideway.

13. The tracking system of claim 1 wherein said carriage emits a gas layer downwardly onto said guideway to support said carriage and said sleeve over said guideway.

14. The tracking system of claim 1, 2 or 3 wherein said guideway is adjustable in height to adjust the vertical tracking angle of said tone arm and stylus.

15. The tracking system of claim 1, 2, 3 or 12 wherein said guideway is supported on at least one pivotable leg above a base and means to pivot said pivot leg to raise or lower said guideway and adjust the vertical tracking angle of said tone arm and stylus.

16. The tracking system of claim 15 wherein at least a pair of pivotable legs connect said guideway with said base.

17. The tracking system of claim 15 wherein a threaded member mounted between said guideway and said support member is turned to adjust the height of said guideway relative to said base.

* * * * *